United States Patent
Huang et al.

(10) Patent No.: US 9,450,810 B2
(45) Date of Patent: Sep. 20, 2016

(54) POLICY-DRIVEN AUTOMATIC REDUNDANT FABRIC PLACEMENT MECHANISM FOR VIRTUAL DATA CENTERS

(71) Applicant: Cisco Technology, Inc., San Jose, CA (US)

(72) Inventors: Senhua Huang, Fremont, CA (US); Bobby Nakamoto, San Jose, CA (US); Ethan M. Spiegel, Mountain View, CA (US); Rakesh M. Pathak, San Jose, CA (US); Sid Ray, San Jose, CA (US)

(73) Assignee: Cisco Technoogy, Inc., San Jose, CA (US)

( * ) Notice: Subject to any disclaimer, the term of this patent is extended or adjusted under 35 U.S.C. 154(b) by 218 days.

(21) Appl. No.: 13/958,337

(22) Filed: Aug. 2, 2013

(65) Prior Publication Data

US 2015/0036480 A1    Feb. 5, 2015

(51) Int. Cl.
*H04L 12/26* (2006.01)
*H04L 12/24* (2006.01)
*G06F 9/50* (2006.01)

(52) U.S. Cl.
CPC ......... *H04L 41/0663* (2013.01); *G06F 9/5077* (2013.01); *H04L 41/12* (2013.01); *H04L 41/0893* (2013.01)

(58) Field of Classification Search
CPC ................................. H04L 41/0663
USPC ....................................... 370/220
See application file for complete search history.

(56) References Cited

U.S. PATENT DOCUMENTS

| | | | | |
|---|---|---|---|---|
| 6,389,130 | B1* | 5/2002 | Shenoda et al. | 379/221.08 |
| 7,266,595 | B1* | 9/2007 | Black et al. | 709/223 |
| 7,633,955 | B1* | 12/2009 | Saraiya | H04L 49/356 370/395.31 |
| 7,860,097 | B1* | 12/2010 | Lovett | H04L 12/4641 370/392 |
| 8,521,890 | B2* | 8/2013 | Bailey | H04L 41/04 709/227 |
| 8,533,285 | B2 | 9/2013 | Natham et al. | |
| 2002/0001307 | A1* | 1/2002 | Nguyen et al. | 370/386 |
| 2003/0208572 | A1* | 11/2003 | Shah et al. | 709/223 |
| 2003/0208581 | A1* | 11/2003 | Behren et al. | 709/223 |
| 2012/0110164 | A1* | 5/2012 | Frey et al. | 709/224 |
| 2012/0226799 | A1* | 9/2012 | Kapur et al. | 709/224 |
| 2012/0324070 | A1* | 12/2012 | Campion et al. | 709/223 |
| 2013/0007261 | A1 | 1/2013 | Dutta et al. | |
| 2013/0055091 | A1 | 2/2013 | Dutta et al. | |
| 2013/0074181 | A1 | 3/2013 | Singh | |
| 2013/0080626 | A1* | 3/2013 | Thireault | 709/224 |
| 2013/0117766 | A1* | 5/2013 | Bax | G06F 13/14 719/323 |
| 2013/0223440 | A1* | 8/2013 | DeCusatis et al. | 370/388 |

* cited by examiner

*Primary Examiner* — Guang Li
(74) *Attorney, Agent, or Firm* — Parker Ibrahim & Berg LLC; James M. Behmke; Stephen D. LeBarron

(57) ABSTRACT

In one embodiment, a service provider management device provides a plurality of redundant fabric motifs, each indicating a subgraph pattern of logical connections for network segments of a virtual data center, and receives virtual data center tenant selection of one or more of the redundant fabric motifs for particular pairs of data center segments of the virtual data center. After determining available physical data center resources that correspond to the tenant selection of one or more of the redundant fabric motifs for particular pairs of data center segments, logical connections may then be established between particular network segments for the virtual data center according to the available physical data center resources corresponding to the tenant selection of one or more of the redundant fabric motifs for particular pairs of data center segments.

18 Claims, 8 Drawing Sheets

X-MOTIF

Y-MOTIF

U-MOTIF

π-MOTIF

λ-MOTIF

POLICY-DRIVEN AUTOMATIC REDUNDANT FABRIC PLACEMENT MECHANISM FOR VIRTUAL DATA CENTERS

TECHNICAL FIELD

The present disclosure relates generally to computer networks, and, more particularly, to virtual data centers.

BACKGROUND

High availability and resilience to failure is one of the highly desired features of networking in the cloud era. For certain types of customers (e.g., banking), moving to cloud services does not mean sacrificing their "five-nine" service assurance guarantee, where availability is guaranteed 99.999% of the time. It is thus critical to construct redundant fabrics for the tenants' virtual data centers that reside in a service provider's physical data centers. A virtual data center represents a set of service requirements from tenants on various resources such as compute, storage, and networking. Networking plays an important role in the optimization of loads, latency, and redundancy. Compute and storage resources as individual resources cannot be fully utilized without the active participation of networking resources. While portions of high availability have been addressed, creating redundant fabrics to provide non-disruptive continuous access to these compute and storage resources in case of device or link failures has been manual and cumbersome.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
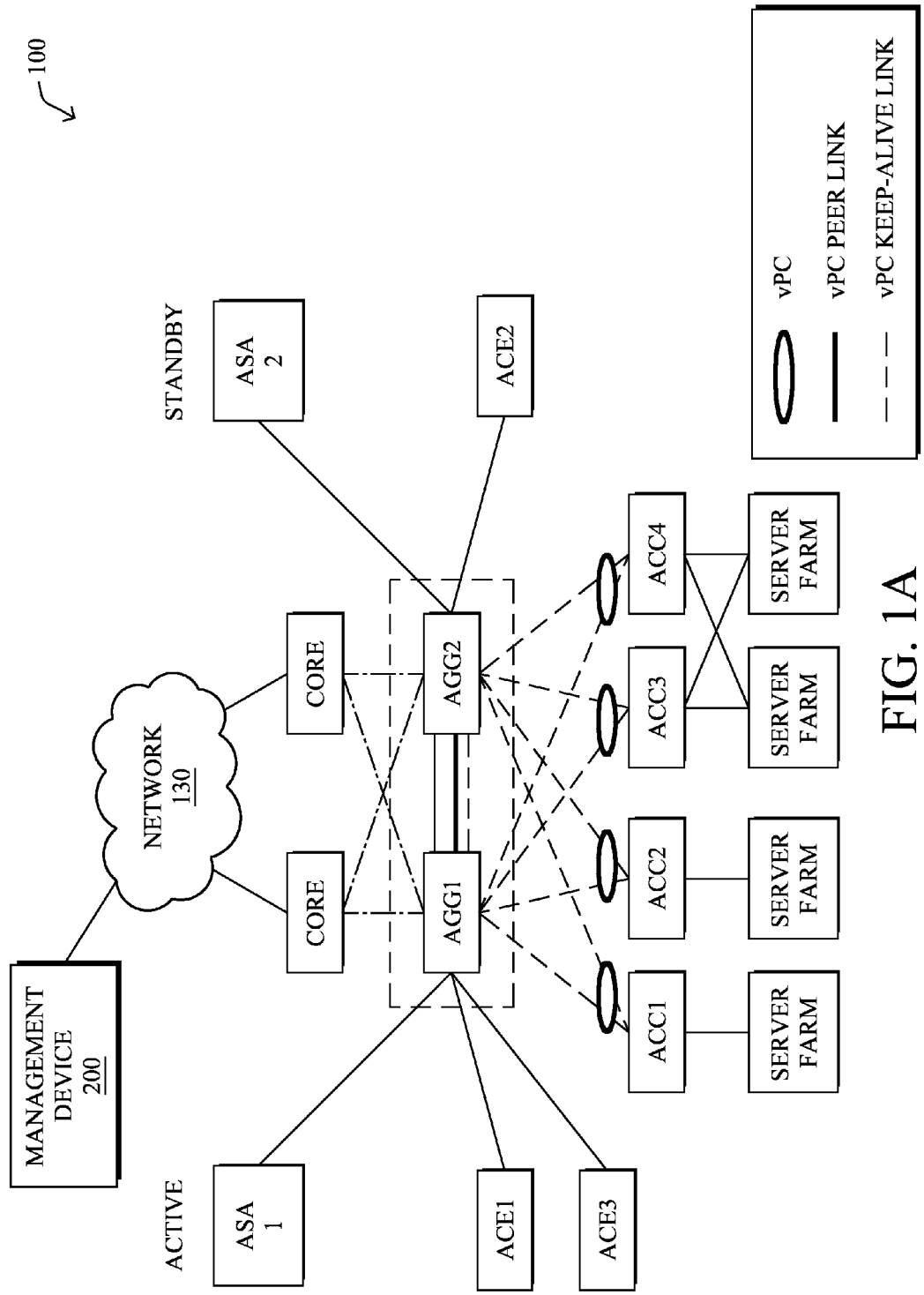
FIGS. 1A-1B illustrate example computer networks.

According to one or more embodiments of the disclosure, a service provider management device provides a plurality of redundant fabric motifs, each indicating a subgraph pattern of logical connections for network segments of a virtual data center, and receives virtual data center tenant selection of one or more of the redundant fabric motifs for particular pairs of data center segments of the virtual data center. After determining available physical data center resources that correspond to the tenant selection of one or more of the redundant fabric motifs for particular pairs of data center segments, logical connections may then be established between particular network segments for the virtual data center according to the available physical data center resources corresponding to the tenant selection of one or more of the redundant fabric motifs for particular pairs of data center segments.

DESCRIPTION

A computer network is a geographically distributed collection of nodes (e.g., devices of a distributed data center or end-client devices such as personal computers and workstations, or other devices) interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1B:
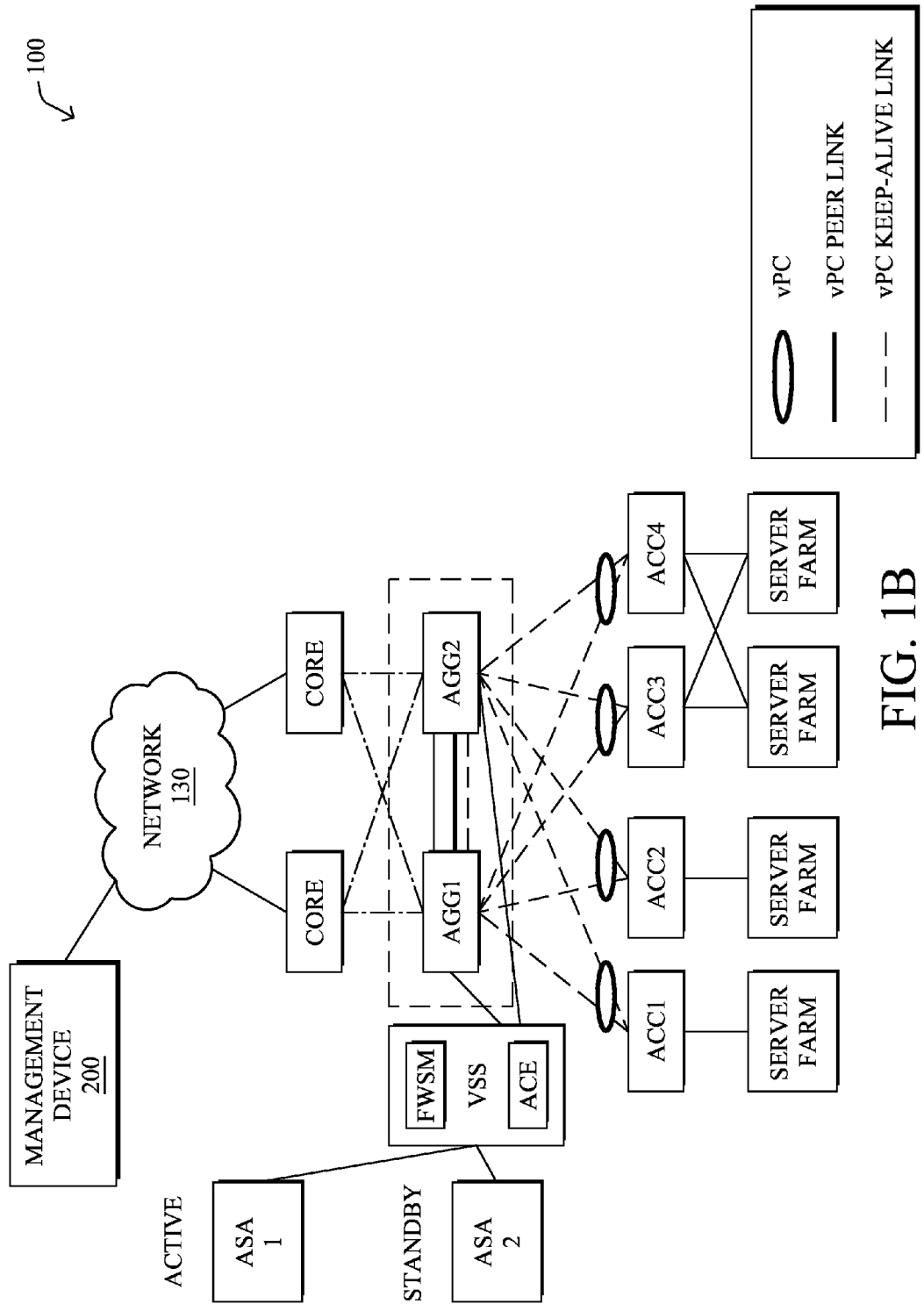

FIGS. 1A-1B are schematic block diagrams of example computer networks 100 illustratively comprising nodes/devices, such as a plurality of devices interconnected by links or networks, as shown. For example, in FIG. 1A, computer network 100 may be arranged for providing services such as a virtual data center, where a network (e.g., WAN) 130 provides customer/tenant access to the virtual data center resources via one or more core (or edge) routers, which through one or more aggregation (Agg) devices (switches/routers), interconnects with various resources such as adaptive security application (ASA) devices, application control engine (ACE) devices, and access (ACC) devices to reach server farms (e.g., compute servers, storage servers, etc.). As shown, certain devices and/or connections may be arranged in redundant configurations, such as active and standby devices, and links may be direct links, logical links, virtual PortChannel (vPC) links (e.g., vPCs, vPC peer links, vPC keep-alive links, etc.). Alternatively, in FIG. 1B a virtual switching system (VSS) may encompass a firewall services module (FWSM), and ACE, and may provide connectivity to one or more other virtual data center resources, such as an active and standby ASA, as shown. Those skilled in the art will understand that any number of nodes, devices, links, etc. may be used in the computer network, and that the view shown herein is for simplicity. Those skilled in the art will also understand that while the embodiments described herein is described generally, it may apply to any network configuration within an Autonomous System (AS) or area, or throughout multiple ASes or areas, etc.

Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, etc.

Figure 2:
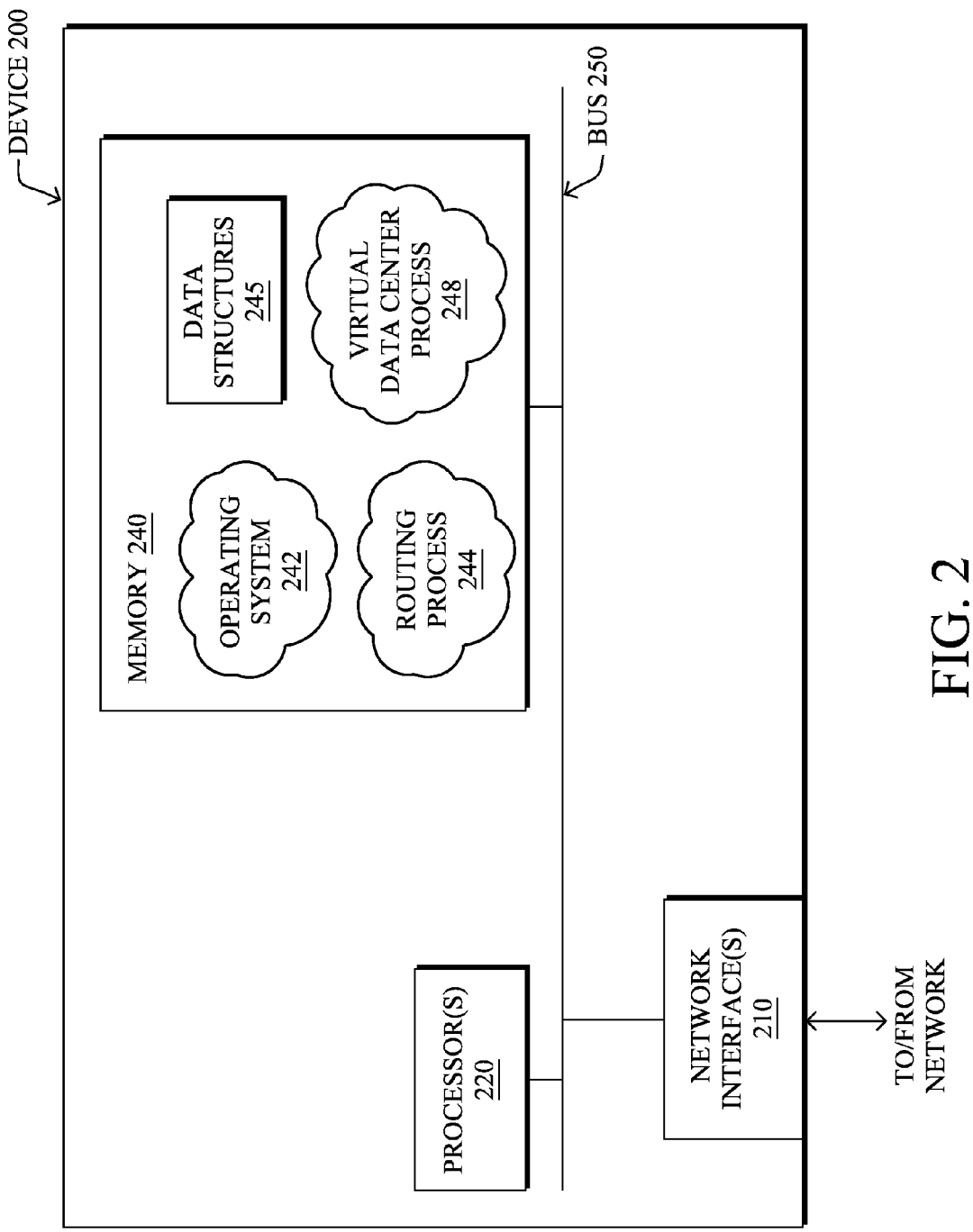
FIG. 2 illustrates an example network device.

FIG. 2 is a schematic block diagram of an example management device 200 that may be used with one or more embodiments described herein. The device comprises one or more network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processes and/or services executing on the device. These software processes and/or services may comprise an illustrative "virtual data center" process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Service Providers (SPs) are increasingly interested in providing Cloud services. To that end, SPs are looking for technologies, both intra- and inter-data center, that address their interconnect requirements in terms of scale, resiliency, multi-tenancy, and virtual machine (VM) mobility. In particular, it is desirable for cloud customers or "tenants" (e.g., consumers or subscribers of a network service provided by a virtual data center, such as customers, enterprises, businesses, etc.) to efficiently establish private (secure and exclusive) network segments to ensure isolated communication amongst a particular set of tenant devices. For instance, each device participating in a virtual data center for a particular tenant needs to be configured in a coordinated manner to ensure that the tenant traffic is completely isolated. As an example, all virtual machines provisioned for a particular tenant may be configured to reside in their own private virtual LAN (VLAN) segment, providing total isolation from other environments. A network segment, then, is a logical network structure that connects devices (e.g., virtual machines) together. When virtual machines are provisioned to reside in respective private VLAN segments, network traffic is only allowed to reach a tenant device over an explicitly defined network segment. In this manner, network segments may provide the basis for applying different quality of service (QoS) parameters, guaranteeing service-level agreements (SLAs), and provide essential tenant specific debugging functionality.

As noted above, high availability and resilience to failure is one of the highly desired features of networking in the cloud era. For certain types of customers (e.g., banking), moving to cloud services does not mean sacrificing their "five-nine" service assurance guarantee, where availability is guaranteed 99.999% of the time. It is thus critical to construct redundant fabrics for the tenants' virtual data centers that reside in a service provider's physical data centers. A virtual data center represents a set of service requirements from tenants on various resources such as compute, storage, and networking. Networking plays an important role in the optimization of loads, latency, and redundancy. Compute and storage resources as individual resources cannot be fully utilized without the active participation of networking resources. While portions of high availability have been addressed, having a redundant fabric is required to provide non-disruptive continuous access to these compute and storage resources in case of device or link failures.

Since one physical data center is able to be shared by hundreds to thousands of tenants, the service offering should be flexible enough so that each tenant could define their own redundancy requirements and get the desired redundant topology for their virtual data centers even the underlying physical topology is fixed after deployment. These requirements could include various node redundancies (e.g., two switches in a redundancy pair) and link redundancies (e.g., a virtual Portchannel is used between access switch and aggregation switch layers). It thus becomes critical for the cloud management software to provide a flexible way for the service provider or the tenants to specify their redundancy offering/requirement without having to upgrade their software.

The techniques herein proposes a policy-based mechanism to automatically select appropriate physical resources in a data center to satisfy the tenants' requirements on redundant fabrics of their virtual data centers. For instance, the recent development of cloud computing enables the sharing of the same physical resources among multiple tenants, and the techniques described below describe a policy-based approach to provide redundant fabric placement that allows for sharing of the same physical topology in a manner that may be used to provide differentiated services to different tenants.

Specifically, according to one or more embodiments of the disclosure as described in detail below, a service provider management device provides a plurality of redundant fabric "motifs", each indicating a subgraph pattern of logical connections for network segments of a virtual data center, and receives virtual data center tenant selection of one or more of the redundant fabric motifs for particular pairs of data center segments of the virtual data center. After determining available physical data center resources that correspond to the tenant selection of one or more of the redundant fabric motifs for particular pairs of data center segments, logical connections may then be established between particular network segments for the virtual data center according to the available physical data center resources corresponding to the tenant selection of one or more of the redundant fabric motifs for particular pairs of data center segments.

Illustratively, the techniques described herein may be performed by hardware, software, and/or firmware, such as in accordance with the virtual data center process 248, which may contain computer executable instructions executed by the processor 220 (or independent processor of interfaces 210) to perform functions relating to the techniques described herein. For example, the techniques herein may be treated as extensions to conventional resource allocation protocols, and as such, may be processed by similar components on similar devices understood in the art that execute those protocols, accordingly.

Notably, there has been no existing solution that automates the redundancy requirements for virtual data center services. In a conventional network configuration, a network administrator has to configure each individual physical switch/device. In the cloud use case, this becomes infeasible because there could be hundreds of tenants sharing the same physical switches using overlay techniques such as VLAN. The techniques herein allow the service providers/tenants to describe the requirements, while automatic placement logic in a resource manager (e.g., virtual data center process 248 of management device 200) handles the creation of virtual data centers based on user input (redundancy requirement policy) and the capabilities and topology of the physical data center.

In other words, the techniques herein provide for the automatic creation of virtual data centers with customized redundancy requirements, as well as providing tenant segregation using overlay techniques, as described below. For instance, the techniques herein support tenant-specific redundancy requirements which are expressed as constraints on the redundant fabric interconnect in a multi-tenant data center (notably, within a single zone, i.e., a single physical data center). With the proposed technology, the service provider could provide different redundant topology and thus different reliability/availability to different tenants over the exact same physical topology, exploiting the redundancy in the physical topology and allowing different levels of failure protection by instantiating different overlay networks.

Operationally, as mentioned above, the techniques herein provide a policy-driven mechanism for service providers and tenants to specify the redundant fabric requirements on virtual data centers. In particular, as described herein, the service providers and/or tenants author the redundancy requirements in a predefined format for each network segment, and the requirements are input along with other service requirements/policies of the tenant's virtual data centers and parsed by the resource manager in the cloud management software (process 248). The resource manager module then finds the best resources available in the physical data center(s) based on the advertised capabilities and topology information from the devices in the physical data center(s). When performing the placement, the resource manager makes sure that the per-hop redundancy requirements are guaranteed by checking the motif of the candidates, i.e., that the connectivity among these candidate physical resources satisfies the required pattern.

In particular, the techniques herein specify the redundancy requirement using an overlay segment and connectivity motif (i.e., a subgraph pattern defining logical connections between physical and/or virtual devices). Specifically, according to one or more embodiments herein, tenants or service providers may define redundancy requirements or redundancy offerings in a cloud environment with a unique combination of overlay constructs and the desired redundant connectivity pattern. Different connectivity patterns have different guarantees against failures in the network (e.g., single device failure, single link failure, etc.). In general, an overlay segment is the basic unit that segregates different tenants' traffic in a multi-tenant data center, and describes how a tenant's network is logically constructed by linking different network devices with particular roles in the physical data center. Each overlay segment may be defined by a sequence of roles such as Aggregation, Access, Compute, Service, etc. For example, an overlay segment "AggregationCompute" defines a logical connection between Aggregation switches and Compute servers.

Figure 3A:
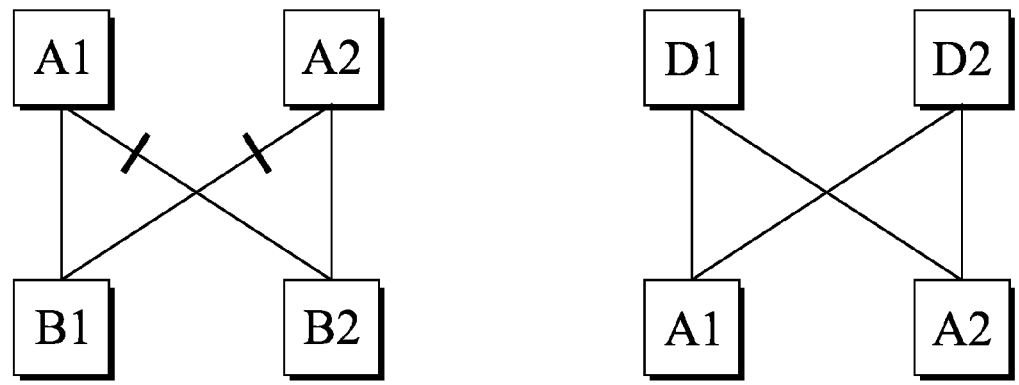
FIGS. 3A-3E illustrate examples of redundant fabric motifs.

FIGS. 3A-3E illustrate example "motifs" that may be defined and available for tenant redundancy requirements according to one or more techniques herein when multiple connection options exist between two redundancy groups that are neighbors in the physical topology. For example, as shown in FIG. 3A, a tenant could require that there is an "X" motif between the aggregation switches and access switches, meaning that two aggregation switches are connected to two access switches in a full mesh. In particular, an "X" means that there are a pair of two devices at each end of the hop, and that each peer at each end is connected to both devices on the other end. For instance, as shown in the example "X" motif topology on the left (e.g., between Aggregation layer and Access layer), two uplinks from each Access switch (B) is connected to the Aggregation switch pair (A), and a spanning tree algorithm may be enabled to configure the loop-free layer-2 (L2) connection. Alternatively, on the right of FIG. 3A, the Aggregation switch pair may also be connected to the Core layer (D) in an "X" motif, e.g., using layer-3 (L3) loop-free connectivity.

Figure 3B:
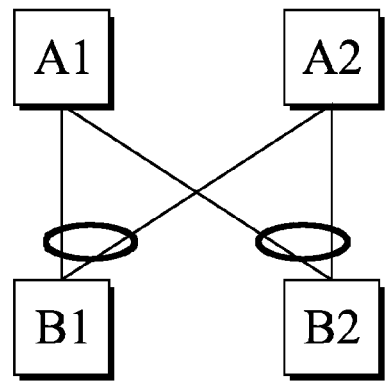

As another example, as shown in FIG. 3B, the tenant could require that there is a "Y" motif between the access switch and the virtual switch layer, meaning that two access switches are connected to the virtual access switch using a virtual port-channel (vPC). For instance, as shown, a double "Y" topology exists when the Aggregation switch pair uses virtual Port channel (vPC) techniques. The difference between the "X" motif and "Y" motif is whether one end point of the segment has one or two logic ports.

Figure 3C:
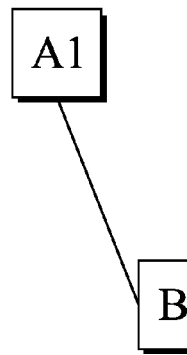
Figure 3D:
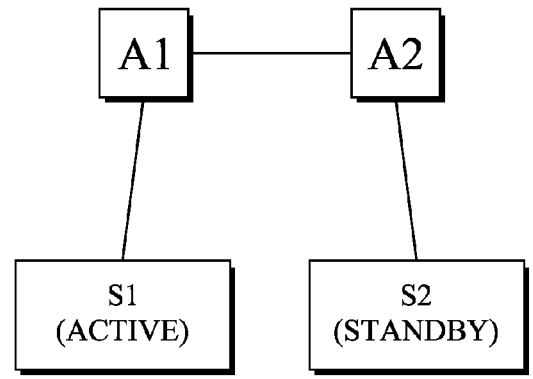
Figure 3E:
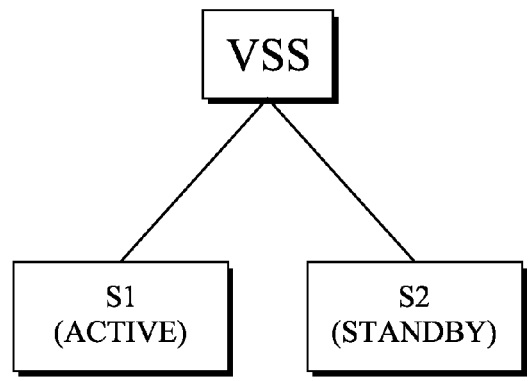

Further, a "U" motif, as shown in FIG. 3C, means that there are a pair of two devices at the originated end of the hop, and two separate links are used to connect these two devices to the one device at the other end of the hop. Yet another type of topology, as shown in FIG. 3D is the one-arm active/standby design ("pi" or "n" motif) of server modules. Still another motif is the "lambda" or "X" motif as shown in FIG. 3E. In general, the motifs can be of different shapes, and can be used to define all kinds of redundancy topology that the users/service providers want. For example, the users/service providers could request that three nodes on one end and one node on the other end of the physical hop may be connected to form a "fork" motif shape. These motifs may be both predefined and added during development.

The techniques herein then allow the management device 200 to compute the redundancy requirement based on the properties of tenant's virtual data center (vDC) requests. Notably, in one or more embodiments, the service provider can define different redundancy policies using the motifs mentioned above and provide a catalog of such policies to its tenants. For example, the service provider could label these policies with "highly redundant", "moderately redundant", and "basically redundant". On the other hand, the service provider can provide a list of virtual data center offerings from which the tenant can select. For example, the service provider could define "gold", "premium", "silver", "bronze", "government", "education", and other offerings. Then, the provider could define a virtual data center request evaluator policy. Within this vDC evaluator policy, the provider specifies the rule to match the type of vDC to the redundant policy offering. For example, for "premium" vDC, the control point would use a "highly redundant" redundancy policy. Such a vDC evaluator policy can be defined using other properties of vDC that are defined by the service provider. For example, for a "premium" vDC with three tiers, use a "highly redundant" policy; while for a "premium" vDC with one tier, use a "moderately redundant" policy. Such a mechanism is beneficial since it provides a very flexible way for the service provider to define its business model. Note that the control point (virtual data center process 248) that implements such a mechanism does not need to be rewritten every time the service provider defines a new evaluator policy.

Since the redundancy requirements are specified by the service providers/tenants in policy, it is up to the creators of the policy to decide what type of redundant fabrics are needed for each network segment in the virtual data center. Different service grades could be defined by the service providers. For example, gold tenants could receive the highest redundant guarantee: any single device failure on any networking layer (data center edge, aggregation, data service node, access, etc.) will not lead to service disruptions. As another example, silver tenants could receive the modest level of redundancy guarantee: any single link failure on any networking layer will not lead to service disruptions.

Figure 4:
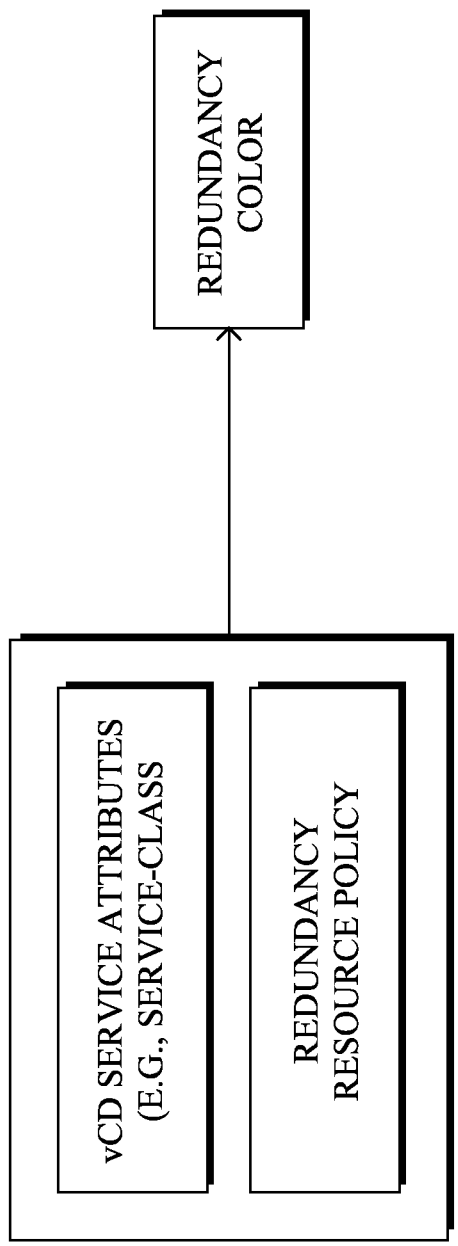
FIG. 4 illustrates an example of policy-based redundancy services.
Figure 5:
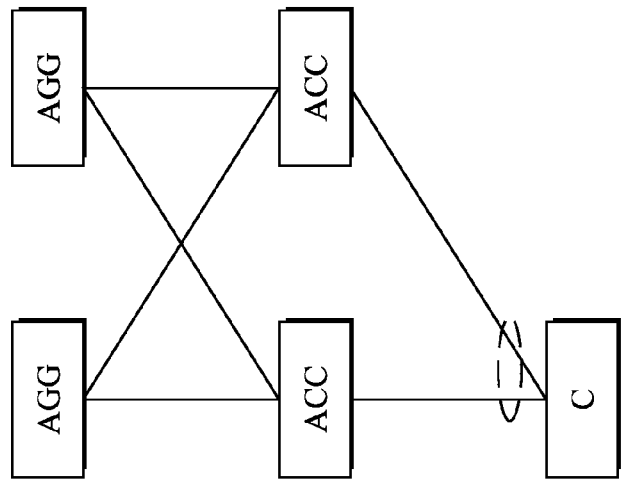
FIG. 5 illustrates an example of a redundancy scheme.

The redundancy resource policy defined by service providers defines the relationship between vDC attributes and the corresponding redundancy offering. On the other hand, according to one or more embodiments herein, a redundancy color may be used by the service provider to define concrete requirements on each physical hop. For example, as shown in FIG. 4, the vDC service attributes (e.g., service-class) and the redundancy resource policy may be further defined as a redundancy color herein (e.g., premium tenants may use redundancy offering "red"). In particular, the techniques herein also allow users/service providers to describe a redundancy requirement/offering by specifying a redundant connectivity motif policy (RCMP) over the overlay segment in a hop-by-hop manner. For example, users/service providers may define a connectivity motif policy called "red" and specify that overlay segment "AggregationCompute" segment use this "red" policy. In the red policy, as shown in FIG. 5, an "X" motif is defined over the first hop between Aggregation switches and Access switches, while a "Y" motif is defined over the second hop between Aggregation switches and Compute server(s). (Note: In this example, node redundancy is specified at the aggregation layer and the access layer with an X motif connecting the two. There is no node redundancy for compute, and a Y motif connects the access and compute layers.)

According to the techniques herein, the management device 200 ensures that the topology requirements (motif requirement) per network segment is satisfied by resource selection algorithms when establishing the virtual data center for the tenant. In particular, a two-phase filtering may be used to guarantee the redundancy requirement, where preliminary node filtering is based on node constraints (e.g., a generic device constraint parser to match service requirements to physical capabilities), with a second filtering evaluates the path to determine whether the subgraph selected satisfies the redundant topology requirement (a motif check), and whether the physical path selected has sufficient bandwidth/delay performance to satisfy a quality of service (QoS) requirement (a QoS check).

Note that as mentioned, the resource manager makes sure that enough bandwidth resources are available on these redundant links. It should be noted, however, that the processing of the path constraint (e.g., bandwidth) is different for different topologies. For instance, for segments that demand "X" motif connectivity, the manager needs to make sure all four links have enough bandwidth to support the traffic of a particular virtual edge. For segments that demand "Y" motif connectivity, the manager needs to make sure the two logic links (e.g., four member ports in Aggregation layer, two port channel interfaces in the Access layer) have enough bandwidth. For the one-arm connectivity, the manager needs only to make sure two logic links (and potentially the inter-switch port channel between the aggregation switches) have enough bandwidth.

In one or more particular embodiments, the resource manager may use a heuristic algorithm to discover acceptable/feasible solutions as early as possible to avoid intensive exhaustive search over the whole solution space. For example, an illustrative placement algorithm may use pivot-based algorithms to prioritize "good" resources to place a vDC, and prunes many infeasible solutions to speed up the algorithm. Generally, candidate generation is based on the redundancy requirement policy for each virtual edge in the request graph, and the techniques herein find the shortest paths between the starting group and the ending group for each virtual edge, while performing motif checking for each virtual edge to filter out infeasible solutions.

As an example specific implementation, the techniques herein provide a heuristic algorithm to solve the redundant fabric placement problem as follows:

I) PRE-PROCESSING: Constructing a hashtable for each overlay segment: Based on the RCMP on each overlay segment that presents in the virtual data center request, a hashtable is constructed. The key of the hashtable is the concatenated role of the two ends of a physical hop and the value is the connectivity motif. For example, the RCMP "red" mentioned above generates two items in the hashtable, one with a key as "AggregationAccess" while the other with a key as "AccessCompute". The value for "AggregationAccess" is "X" while the value for "AccessCompute" is "Y".

II) Resource-Selection:
  A) Node Filtering: find all physical devices that are feasible for a particular role. As a result of this filtering operation, each virtual node in the graph has a list of candidates for selection.
  B) For each virtual edge (another name for overlay segment) in the virtual data center, do the following:
    i) Node Redundancy: Find out the number of physical devices that are needed to fulfill the connectivity motif requirements for each virtual node. For example, with the example "red" RCMP, the number of physical aggregation switches should be two while the number of compute server should be one.

ii) Candidate presentation: Different from the placement without redundancy requirement, here each candidate for each virtual node potentially comprises multiple physical devices. Using the "red" RCMP as an example, two physical aggregation switches need to be selected. Suppose there are ten aggregation switches in the data center, this gives n.choose.k(10, 2)=45 candidate pairs of combinations.

iii) Path-Finding: For each virtual node of the virtual edge, pick one physical device from the candidate (if there are multiple devices, arbitrarily pick one of them). Then find *all* shortest paths between the two physical devices.

iv) Candidate-Construction: Merge all the intermediate physical devices found in the Path-Finding step so that they are ordered based on their distances from the starting point of the path. As a result of such a merge operation, the algorithm has the candidate devices for each hop in a potential path to realize the virtual edge. Note that here a "path" is different from the traditional definition of a path: it is really a subgraph. For the example RCMP on overlay segment AggregationCompute, if we place this segment in a typical Aggregation-Access-Compute Pod, there might be two Aggregation switches, four Access switches, and one Compute server (or rack/cluster) in the candidate as a result of Path-finding. Now, since the algorithm needs two Aggregation switches and one Compute at both ends, and two Access switches in the middle, the algorithm can construct n.choose.k(4, 2)=6 candidates for this virtual edge (AggregationCompute).

v) Evaluate the connectivity motif requirement for each candidate obtained in the prior step using the hashtable lookup, and remove those paths that violate the requirements.

vi) Evaluate the QoS requirements for each candidate obtained and remove those paths that violate the requirements. Note that equal amount of resources are needed to be reserved on all redundant links.

vii) The feasible candidate will be kept for future evaluation.

viii) Advance to next Candidate.

C) Calculate a fitness function for each feasible graph mapping solution and use the one achieving the best resource usage as the final solution.

Note that the techniques herein define an algorithm to derive the number of nodes required per overlay role (e.g., Access switch, Aggregation switch) from the motif requirements per overlay segment. That is, instead of users/service providers specifying the number of physical boxes for each virtual node, the techniques herein allows for only the connectivity motif pattern to be specified for the virtual edge, while the number of physical nodes required per role can be derived from this policy as described in the "Node Redundancy" step in the algorithm illustrated above. Also, the manner in which each tenant's redundancy requirement is specified is independent of the actual physical topology. With the logical overlay segment construct, even where the underlying physical infrastructure is shared by multiple tenants, different redundancy topologies over the virtual data center can be achieved according to the techniques herein.

Figure 6:
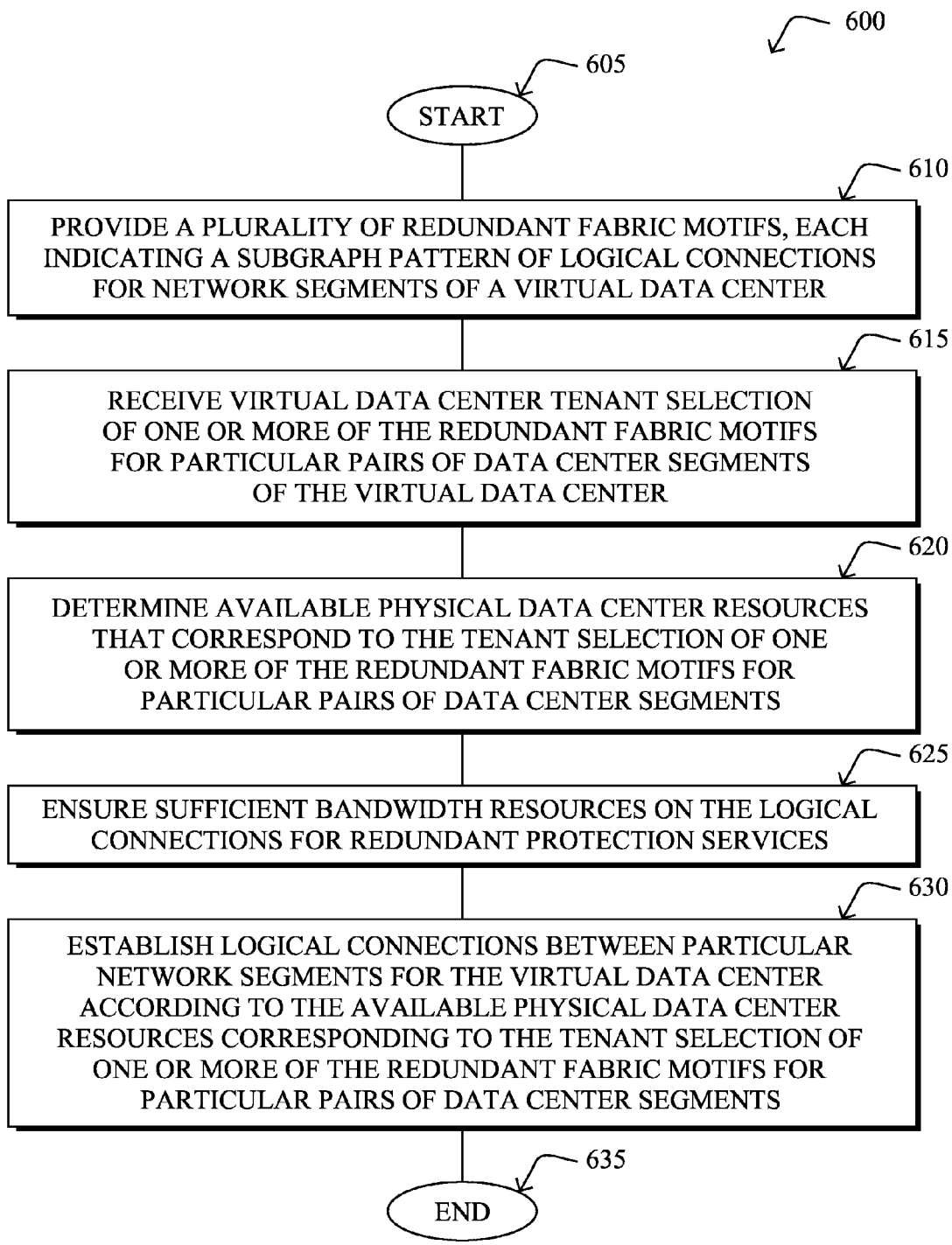
FIG. 6 illustrates an example simplified procedure for a policy-driven automatic redundant fabric placement mechanism for virtual data centers.

FIG. 6 illustrates an example simplified procedure 600 for a policy-driven automatic redundant fabric placement mechanism for virtual data centers in accordance with one or more embodiments described herein. The procedure 600 may start at step 605, and continues to step 610, where, as described in greater detail above, a plurality of redundant fabric motifs a provided by a service provider (e.g., via management device 200), each indicating a subgraph pattern of logical connections for network segments of a virtual data center. For example, as mentioned above, such redundant fabric motifs may be an X motif, a Y motif, a U motif, a fork motif, a pi motif, a lambda motif, etc.

In step 615, the device 200 receives a virtual data center tenant selection of one or more of the redundant fabric motifs for particular pairs of data center segments of the virtual data center, such as the pairings between aggregation switches, access switches, virtual switches, data center edges, data service nodes, compute servers, service devices, etc. Note that in one embodiment, as mentioned above, a plurality of service grades may be defined that indicate particular redundant fabric motif schemes between specific types of data center segments of the virtual data center, such that receiving virtual data center tenant selection of one or more of the redundant fabric motifs for particular pairs of data center segments of the virtual data center actually comprises receiving tenant selection of a particular service grade. Illustratively, such service grades may be things such as a first grade where any single device failure on any network layer of the virtual data center does not lead to a service disruption, a second grade where any single link failure on any network layer of the virtual data center does not lead to a service disruption, and so on.

In step 620, the management device determines available physical data center resources that correspond to the tenant selection of one or more of the redundant fabric motifs for particular pairs of data center segments, where the available physical data center resources may have been discovered via advertised capabilities and topological information received from the physical data center resources, as noted above. As also discussed above, a heuristic algorithm may be applied to select adequate physical data center resources without searching an entire solution space. In addition, in step 625, the device may optionally ensure sufficient bandwidth resources for the logical connections that would be established for redundant protection services.

Accordingly, in step 630, the device 200 establishes the appropriate logical connections between particular network segments for the virtual data center according to the available physical data center resources corresponding to the tenant selection of one or more of the redundant fabric motifs for particular pairs of data center segments. Note that one or more other service requirements of the tenant may also be considered as mentioned above when establishing logical connections between particular network segments for the virtual data center.

The procedure 600 illustratively ends in step 635, though may continue to reestablish logical connections based on updated tenant requests and/or resource availability changes in any of the steps above. It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a policy-driven automatic redundant fabric placement mechanism for virtual data centers. In particular, the techniques herein enable automatic redundant fabric placement for virtual data centers in a shared physical infrastructure, allowing cloud service providers to provide differential service offerings to its tenants based on redundancy in the networks. For instance, the redundancy requirements are guaranteed with automatic placement algorithms together with other path constraints such as bandwidth and latency.

Moreover, the techniques herein propose a practical and programmable approach to specify the redundancy requirements, such as using overlay segments as the target and using motifs (subgraph patterns) rather than node redundancy as the manner by which to describe redundancy. The techniques herein depart from the traditional single-node redundancy specification as active/standby, hot standby, etc., and rather treat edges as the basic unit of redundancy and emphasizes the topology redundancy. Also, the techniques herein propose a way to evaluate the redundancy requirements based on the attributes of tenants' virtual data center requests, and calculate a feasible solution for the redundancy placement.

Notably the techniques herein offer enhancements to conventional resource allocation based on path constraint requirements, in that they provide automatic management of redundant fabric for virtual data centers in a generic (physical topology agnostic) way. The path constraints include QoS requirements from the tenant (such as bandwidth, delay). But the redundancy requirement is substantially different in the following aspects: 1) Path constraints are mostly focused on the quantitative characteristics of the physical link capacities, while redundancy constraints, on the other hand, are topology constraints, where motif checking needs to be performed for each subgraph selection. 2) For path constraints, only one shortest path is calculated for each virtual edge in the virtual graph representing the virtual data center, while the techniques herein check a set of shortest paths with desired subgraph properties, and output the best motif selection for each virtual edge.

While there have been shown and described illustrative embodiments that provide for a policy-driven automatic redundant fabric placement mechanism for virtual data centers, it is to be understood that various other adaptations and modifications may be made within the spirit and scope of the embodiments herein. For example, the embodiments have been shown and described herein with relation to specific data center and cloud protocols and/or terminology. However, the embodiments in their broader sense are not as limited, and may, in fact, be used with other types of networks, protocols, and/or terms.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
providing a plurality of redundant fabric motifs to be selected by a virtual data center tenant, each indicating a subgraph pattern of logical connections for network segments of a virtual data center;
receiving a virtual data center tenant selection of one or more of the redundant fabric motifs for particular pairs of data center segments of the virtual data center;
determining available physical data center resources that correspond to the tenant selection of one or more of the redundant fabric motifs for particular pairs of data center segments;
establishing logical connections between particular network segments for the virtual data center according to the available physical data center resources corresponding to the tenant selection of one or more of the redundant fabric motifs for particular pairs of data center segments; and
defining a plurality of service grades that indicate particular redundant fabric motif schemes between specific types of data center segments of the virtual data center, wherein receiving virtual data center tenant selection of one or more of the redundant fabric motifs for particular pairs of data center segments of the virtual data center comprises receiving tenant selection of a particular service grade.

2. The method as in claim 1, further comprising:
ensuring sufficient bandwidth resources on the logical connections for redundant protection services.

3. The method as in claim 1, wherein the plurality of redundant fabric motifs are an X motif; a Y motif; a U motif; a fork motif; a pi motif; or a lambda motif.

4. The method as in claim 1, wherein data center segments are aggregation switches; access switches; virtual switches; data center edges; data service nodes; compute servers; or service devices.

5. The method as in claim 1, further comprising:
considering one or more other service requirements of the tenant when establishing logical connections between particular network segments for the virtual data center.

6. The method as in claim 1, wherein service grades are a first grade where any single device failure on any network layer of the virtual data center does not lead to a service disruption; or a second grade where any single link failure on any network of the virtual data center does not lead to a service disruption.

7. The method as in claim 1, further comprising:
discovering the available physical data center resources via advertised capabilities and topological information received from the physical data center resources.

8. The method as in claim 1, further comprising:
applying a heuristic algorithm to select adequate physical data center resources without searching an entire solution space.

9. An apparatus, comprising:
one or more network interfaces to communicate within a computer network;
a processor coupled to the network interfaces and adapted to execute one or more processes; and
a memory configured to store a process executable by the processor, the process when executed to:
provide a plurality of redundant fabric motifs to be selected by a virtual data center tenant, each indicating a subgraph pattern of logical connections for network segments of a virtual data center;

receive a virtual data center tenant selection of one or more of the redundant fabric motifs for particular pairs of data center segments of the virtual data center;

determine available physical data center resources that correspond to the tenant selection of one or more of the redundant fabric motifs for particular pairs of data center segments;

establish logical connections between particular network segments for the virtual data center according to the available physical data center resources corresponding to the tenant selection of one or more of the redundant fabric motifs for particular pairs of data center segments; and define a plurality of service grades that indicate particular redundant fabric motif schemes between specific types of data center segments of the virtual data center, wherein receiving virtual data center tenant selection of one or more of the redundant fabric motifs for particular pairs of data center segments of the virtual data center comprises receiving tenant selection of a particular service grade.

10. The apparatus as in claim 9, wherein the process when further executed to:

ensure sufficient bandwidth resources on the logical connections for redundant protection services.

11. The apparatus as in claim 9, wherein the plurality of redundant fabric motifs are an X motif; a Y motif; a U motif; a fork motif; a pi motif; and a lambda motif.

12. The apparatus as in claim 9, wherein data center segments are aggregation switches; access switches; virtual switches; data center edges; data service nodes; compute servers; or service devices.

13. The apparatus as in claim 9, wherein the process when further executed to:

consider one or more other service requirements of the tenant when establishing logical connections between particular network segments for the virtual data center.

14. The method as in claim 9, wherein service grades are a first grade where any single device failure on any network layer of the virtual data center does not lead to a service disruption; or a second grade where any single link failure on any network of the virtual data center does not lead to a service disruption.

15. The apparatus as in claim 9, wherein the process when further executed to:

discover the available physical data center resources via advertised capabilities and topological information received from the physical data center resources.

16. The apparatus as in claim 9, wherein the process when further executed to:

apply a heuristic algorithm to select adequate physical data center resources without searching an entire solution space.

17. Logic encoded in one or more non-transitory tangible media for execution and when executed by a machine to:

provide a plurality of redundant fabric motifs to be selected by a virtual data center tenant, each indicating a subgraph pattern of logical connections for network segments of a virtual data center;

receive a virtual data center tenant selection of one or more of the redundant fabric motifs for particular pairs of data center segments of the virtual data center;

determine available physical data center resources that correspond to the tenant selection of one or more of the redundant fabric motifs for particular pairs of data center segments;

establish logical connections between particular network segments for the virtual data center according to the available physical data center resources corresponding to the tenant selection of one or more of the redundant fabric motifs for particular pairs of data center segments; and define a plurality of service grades that indicate particular redundant fabric motif schemes between specific types of data center segments of the virtual data center, wherein receiving virtual data center tenant selection of one or more of the redundant fabric motifs for particular pairs of data center segments of the virtual data center comprises receiving tenant selection of a particular service grade.

18. The logic as in claim 17, wherein the logic when further executed to:

ensure sufficient bandwidth resources on the logical connections for redundant protection services.

* * * * *

UNITED STATES PATENT AND TRADEMARK OFFICE
CERTIFICATE OF CORRECTION

PATENT NO. : 9,450,810 B2
APPLICATION NO. : 13/958337
DATED : September 20, 2016
INVENTOR(S) : Senhua Huang et al.

Page 1 of 1

It is certified that error appears in the above-identified patent and that said Letters Patent is hereby corrected as shown below:

In the Claims

In Column 12, Line 47, Claim 6 please amend as shown:
on any network layer of the virtual data center does not lead to a In Column 13, Line 42, Claim 14 please amend as shown:
On any network layer of the virtual data center does not lead to a Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*